3,408,397
METHYL PENTAMETHYLENE DIAMINE PROCESS
Julian Feldman, Amberly Village, and Martin Thomas, Cincinnati, Ohio, assignors to National Distillers and Chemical Corporation, New York, N.Y., a corporation of Virginia
No Drawing. Filed June 1, 1965, Ser. No. 460,561
12 Claims. (Cl. 260—583)

ABSTRACT OF THE DISCLOSURE

A process for preparing beta-alkyl-alpha, omega-diaminoalkanes which comprises sequentially contacting an alpha substituted aliphatic dinitrile containing an unsaturated side chain with hydrogen at a temperature within the range of about 10° to 100° C., a pressure less than about 2,000 p.s.i. in the presence of a Group VIII hydrogenation catalyst, and then contacting the resulting reaction mixture with hydrogen in the presence of a suppressant compound selected from the group consisting of ammonia, tertiary alkyl amine, and mixtures thereof, at a temperature within the range of about 50° to 150° C. and at a pressure of at least 1,000 p.s.i., in the presence of a Group VIII hydrogenation catalyst, and recovering said beta-alkyl-alpha, omega-diaminoalkane.

The present invention relates to the production of beta-alkyl-alpha, omega-diaminoalkanes, and more particularly the invention pertains to a novel method of producing 2-methyl-1,5-diaminopentane by stepwise reduction of 2-methylene glutaronitrile.

Saturated aliphatic diamines have found important and widespread use as valuable chemical intermediates. Foremost of these uses is as comonomers for the preparation of polyamides in conjunction with dicarboxylic acids such as the process for manufacturing nylon. The polyamides can be utilized in fibers, coating, films, molding, casting, and extrusion resins, adhesives, etc. It is also known that the diamines can be employed for many of the same applications as monoamines, e.g., medicinals, catalysts, rubber accelerators, emulsifying agents, corrosion inhibitors, etc.

In spite of the high commercial potential of saturated aliphatic diamines as a class of compounds, only two diamines are readily available in commercial quantities, namely hexamethylene diamine and ethylene diamine. Because of the complicated synthesis and the high cost of starting materials, other diamines have not been produced commercially.

It has recently been suggested to prepare 2-methyl-1,5-diaminopentane, one of the most interesting beta-alkyl-alpha, omega-diaminoalkanes, by the direct hydrogenation of 2-methlene glutaronitrile in a one step catalytic process. Reduction of the nitrile groups in this process required the presence of ammonia or an amine to repress secondary amine formation. It was found, however, that the methylene group in 2-methylene glutaronitrile is activated to such an extent that the methylene group reacts with the ammonia or amine resulting in the formation of undesirable quantities of polymeric and condensation by-products.

One object of the present invention is to provide a novel and improved process for the preparation of beta-alkyl-alpha, omega-diaminoalkanes from alpha-substituted, aliphatic dinitriles.

Another object of the present invention is to provide a catalytic hydrogenation process for the preparation of beta-alkyl-alpha, omega-diaminoalkanes from alpha-substituted, aliphatic dinitriles which avoids the difficulties encountered in the recently proposed process.

A further object of the present invention is to provide an improved process for the preparation of 2-methyl pentamethylene diamine from 2-methylene glutaronitrile.

These and other objects of the invention will become readily apparent from the ensuing description and illustrative embodiments.

In accordance with the present invention it has now been found that beta-alkyl-alpha, omega-diaminoalkanes can readily be prepared in superior yields by a two-step hydrogenation of alpha-substituted aliphatic dinitriles under carefully controlled reaction conditions. In general, the first step comprises catalytically hydrogenating the dinitrile starting material under moderate temperature and pressure conditions so as to completely hydrogenate the unsaturated side chain with substantially no hydrogenation of either nitrile group. The resulting reaction product, n alpha-alkyl, aliphatic dinitrile, is then preferably separated from catalyst unless the same catalyst or catalyst mixture is used in both hydrogenation steps. In the second step, the saturated dinitrile obtained from the first step is hydrogenated at elevated temperatures and pressures, preferably in the presence of a Group VIII hydrogenation catalyst and a suppressant for secondary amine formation, such as ammonia or selected amines. Completion of this reaction is indicated by cessation of hydrogen uptake. The resulting betal-alkyl-alpha, omega-diaminoalkane product can be isolated or recovered from the resulting reaction product mixture by conventional means such as fractional, distillation, extraction, and the like.

In order to minimize undesirable polymerization and side reactions, it is preferable to carry out the second step in the presence of an inert diluent. Generally, it is preferable to carry out the first step in the absence of any added diluent, although a diluent may be added if so desired. It is also desirable at times to provide agitation or stirring during either or both of the hydrogenation steps, and this may be accomplished by utilizing conventional equipment or by passing the liquid reactants over a fixed bed of the solid catalytic material.

The alpha-substituted, aliphatic dinitrile employed as the starting material in the process of this invention has the following structural formula:

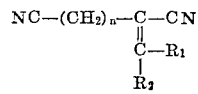

wherein $n$ is an integer from about 1 to 12, preferably about 1 to 6, and $R_1$ and $R_2$ are selected from the group consisting of hydrogen and an aliphatic, straight or branched chain, alkyl group having from 1 to 12 carbon atoms, and preferably from 1 to 6 carbon atoms. $R_1$ and $R_2$ may be the same or different. Examples of specific dinitrile compounds which can be employed as starting material includes 2-methylene glutaronitrile, 2-ethylidene glutaronitrile, 2-ethylidene adiponitrile and 2-propylidene glutaronitrile. The use of 2-methylene glutaronitrile is especially preferred.

The diluent or diluents which may be employed in carrying out the process of this invention must exhibit a measurable solubility toward the dinitrile starting materials, and when employed in the second step, toward any ammonia or amine present. It must also be inert to the reactants and products. The same diluent may be employed in both reaction steps of the present process. An example of suitable solvents include low molecular weight alkanols having from 1 to 12 carbon atoms per molecule. The use of saturated, aliphatic alcohols having from 1 to 6 carbon atoms per molecule have been found particularly effective for this purpose. Such alcohols include methanol, ethanol, propanol, isopropanol, butanol, hexanol, etc. The actual amount of diluent employed is not critical and may vary over a wide range. In general, the volume ratio of diluent to the dinitrile feed material will range from about 1:1 to 2:1, preferably about 1:1.

The use of ammonia as the suppressant for secondary amine formation in the second step of the process is preferred. However, it has also been found that tertiary alkyl amines having from about 3 to 18 carbon atoms per molecule have also proven to be effective. Of the tertiary alkyl amines, tertiary aliphatic amines having from 3 to 15 carbon atoms such as triethylamine, trimethylamine, tri-n-butylamine, triisobutylamine, tri-n-propylamine and tri-n-amylamine are preferred. Only a sufficient amount of the ammonia or amine necessary to effectively suppress the formation of secondary amines need be employed. In general, however, the molar ratio of ammonia or amine to the aliphatic dinitrile starting material will range from about 1:1 to 10:1, and preferably from 4:1 to 6:1. It should be understood that higher ratios may also be employed without effecting the rate of conversion to the desired beta-alkyl-alpha, omega-diaminoalkane product.

The particular catalyst employed in each step of the process is an important feature of this invention. It was found essential to employ Group VIII hydrogenation catalysts, since other metal catalysts were found to be ineffective or undesirable for the present purposes. For the first step, it is preferred to use noble metal selected from the group consisting of platinum and palladium metal-containing catalysts. For the second step, preferred catalysts are selected from the group consisting of nickel, cobalt, and ruthenium metal-containing catalysts. It is also possible to use a copper chromite ($Cu_2O$—$Cr_2O_3$) catalyst. Only catalytic amounts of such catalysts need be employed.

It will be further understood that for some purposes it is also possible to use the nickel, cobalt or ruthenium metal-containing catalysts in both hydrogenation steps. This has the advantage of eliminating an intermediate catalyst separation step. Nevertheless, the preferred method of carrying out the process of this invention involves the use of separate catalyst systems, as described above.

For either step, it is often desirable to employ the catalyst on an inert support or carrier such as carbon, kieselguhr, silica, alumina, and the like. For the second step, it is also possible to enhance the activity of the catalyst by utilizing a metal or metal oxide promoter such as zirconium oxide, etc. Especially preferred catalysts for the first step are palladium on carbon, platinum on carbon, platinum metal, platinum oxide, palladium metal, Adams catalyst, etc. Preferred for the second step are Raney cobalt, zirconium-promoted cobalt on kieselguhr, Raney nickel, nickel in kieselguhr, and ruthenium on carbon. It will be understood, however, that neither the use of a support nor the use of a promoter are critical features of the present invention. Advantageously, each of the above catalysts is commercially available.

Although the amount of metal catalyst employed in either step need only be sufficient to obtain catalytic action, the amount of metal-containing catalyst generally employed in the first step will range from about 0.1 to 30%, and preferably about 1 to 10% by weight, based on the total weight of the unsaturated dinitrile feed material. In the second step, the catalyst employed will generally range from about 6 to 50%, and preferably about 10 to 40%, by weight based on the total weight of saturated dinitrile feed.

The temperature at which the hydrogenation of the first step of the process is carried out is relatively mild, ranging generally from about 10° to 100° C., and preferably from about 20° to 80° C. At lower temperatures, the rate of reaction is undesirably slow, while the use of higher temperatures tends to result to premature reduction of the nitrile groups and undesirable side reactions. The hydrogen pressures employed in the first step will range from about atmospheric up to about 2000 p.s.i., and preferably from about 100 to 1000 p.s.i.

In the second step of the process, higher temperatures, in the range of about 50° to 150° C., and preferably, from above about 80° to 120° C. are used. If lower temperatures are employed, it was found that the rate of reaction is undesirably slow. Higher temperature are possible where increased reaction rates are deemed necessary. In general, the reaction temperatures employed in the second step will be at least 30° C., and preferably from about 50° to 120° C., higher than the temperature used in the first step. The hydrogen pressure in the second step will range from about 1000 to 10,000 p.s.i., preferably from about 2,000 to 6,000 p.s.i. Thus, the pressure in the second step will be at least 1,000 p.s.i., and preferably from about 2,000 to 6,000 p.s.i., higher than the pressure in the first step. The second step, in addition to more severe operating conditions, also requires the use of an amount of hydrogen at least 1.2 times the stoichiometric amount required to convert the nitrile groups to amine groups. Although stoichiometrically excess amounts of hydrogen can also be employed in the first step, it is preferred to use the stoichiometric amount or no more than 5 times stoichiometry.

The compounds produced by practicing the process of this invention are beta-alkyl-alpha, omega-diaminoalkanes having the following structural formula:

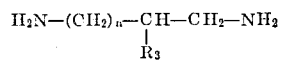

wherein $n$ is an integer from about 1 to 12, preferably about 2 to 6, and $R_3$ is a straight or branched-chain alkyl radical having from 1 to 12 carbon atoms, and preferably 1 to 6 carbon atoms. Specific compounds include, for example: 2-methyl-1,5-diaminopentane, 2-ethyl-1,7-diaminoheptane, 2-ethyl-1,4-diaminobutane, 2-methyl-1,10-diaminodecane, 2-isopropyl-1,6-diaminohexane.

The invention will be more fully understood by reference to the following illustrative example.

EXAMPLE

In the first step, 2-methylene glutaronitrile 574 g. (5.4 moles) was hydrogenated in a stainless steel Magna Dash autoclave with 5.7 g. of 5% palladium on carbon as catalyst at a temperature of 22° C. and 100 atms. of hydrogen pressure. The reduction proceeded until there was no further drop in hydrogen pressure. Then, the reaction mixture was filtered to remove the catalyst. The product recovered, weighed 561 g. Gas chromatographic analysis showed the product to be completely saturated, i.e., 2-methyl glutaronitrile.

In the second step, 241 g. (2.2 moles) of the 2-methyl glutaronitrile was hydrogenated in the presence of 140 g. Raney cobalt catalyst, 180 g. of anhydrous ammonia, and 250 ml. of absolute alcohol at 100° C. and a total pressure of 5400 p.s.i. The catalyst was then filtered from the reaction mixture, which contained 204 g. (80% of theory) of 2-methyl-1,5-diaminopentane.

Further analysis of the reaction product mixture obtained from the second hydrogenation step revealed the presence of about 18% of 3-methylpiperidine and about 2% polymeric material. The former is an interesting compound insofar as it can be readily recovered by conventional means and dehydrogenated by known procedures to form 3-methyl pyridine, which is easily oxidized to obtain nicotinic acid.

The above data show that the process of this invention can be effectively employed for the production of valuable diamine compounds which heretofore were not commercially available.

While a particular embodiment of this invention is shown above, it will be understood that the invention is obviously subject to variations and modification without departing from its broader aspects.

What is claimed is:

1. A process for preparing beta-alkyl-alpha, omega-diaminoalkanes which comprises the following sequential steps:

(a) contacting a dinitrile compound having the formula

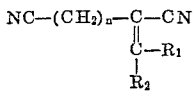

wherein $n$ is an integer from 1 to 12, $R_1$ and $R_2$ are selected from the group consisting of hydrogen and alkyl radicals having from 1 to 12 carbon atoms, with hydrogen at a temperature within the range of about 10° to 100° C., a pressure less than about 2,000 p.s.i., in the presence of a hydrogenation catalyst selected from the group consisting of palladium and platinum metal-containing catalysts; and (b) contacting the resulting reaction product mixture with hydrogen in the presence of a suppressant compound selected from group-consisting of ammonia, tertiary alkyl amine, and mixtures thereof, at a temperature within the range of about 50° to 150° C. and at a pressure of at least 1,000 p.s.i., in the presence of a hydrogenation catalyst selected from the group consisting of nickel, cobalt and ruthenium metal-containing catalysts, separating the catalyst residue from the resulting reaction product mixture, and recovering said beta-alkyl-alpha, omega-diaminoalkane.

2. The process of claim 1 wherein the $R_1$ and $R_2$ are hydrogen.

3. The process of claim 1 wherein said step (a) reaction temperature is within the range of about 20° to 80° C.

4. The process of claim 1 wherein said step (a) reaction pressure is within the range of about 100 to 1,000 p.s.i.

5. The process of claim 1 wherein said step (b) reaction temperature is within the range of about 50° to 150° C.

6. The process of claim 1 wherein said step (b) reaction pressure is within the range of about 1,000 to 10,000 p.s.i.

7. The process of claim 1 wherein said step (a) hydrogenation catalyst is a palladium metal-containing catalyst.

8. The process of claim 1 wherein said step (a) hydrogenation catalyst is a platinum metal-containing catalyst.

9. The process of claim 1 wherein said step (b) hydrogenation catalyst is a cobalt metal-containing catalyst.

10. The process of claim 1 wherein said suppressant is ammonia.

11. The process of claim 1 wherein said suppressant is an admixture of ammonia and a lower alkanol.

12. The process of claim 1 wherein said dinitrile compound is 2-methylene glutaronitrile.

References Cited

UNITED STATES PATENTS 2,504,024  4/1950  Howk et al. _____ 260—583

OTHER REFERENCES

The Chemistry of Acrylonitrile, American Cyanamid Company, New York, N.Y., p. 14 (1959), QD 401 A52.

CHARLES B. PARKER, *Primary Examiner.*

R. L. RAYMOND, *Assistant Examiner.*